United States Patent Office

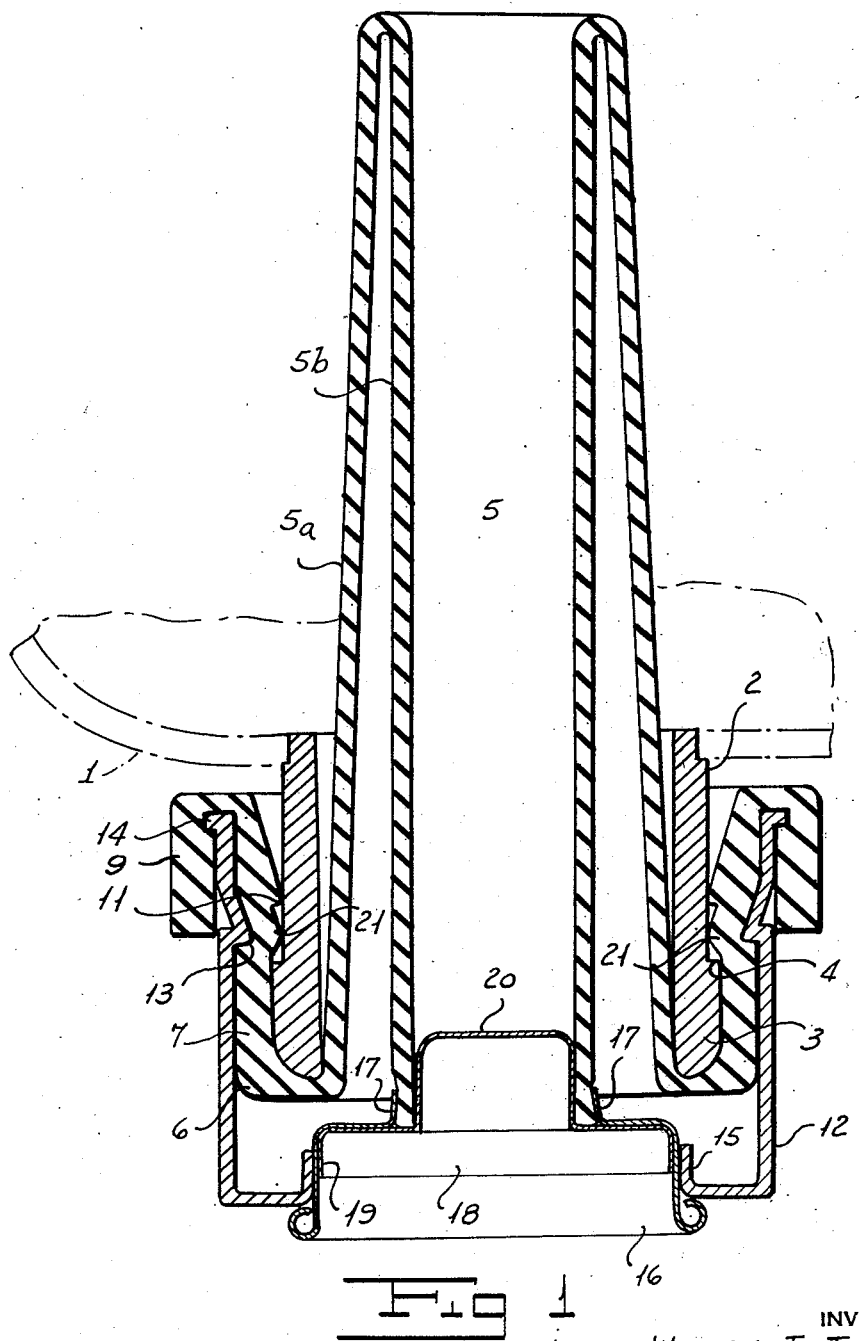

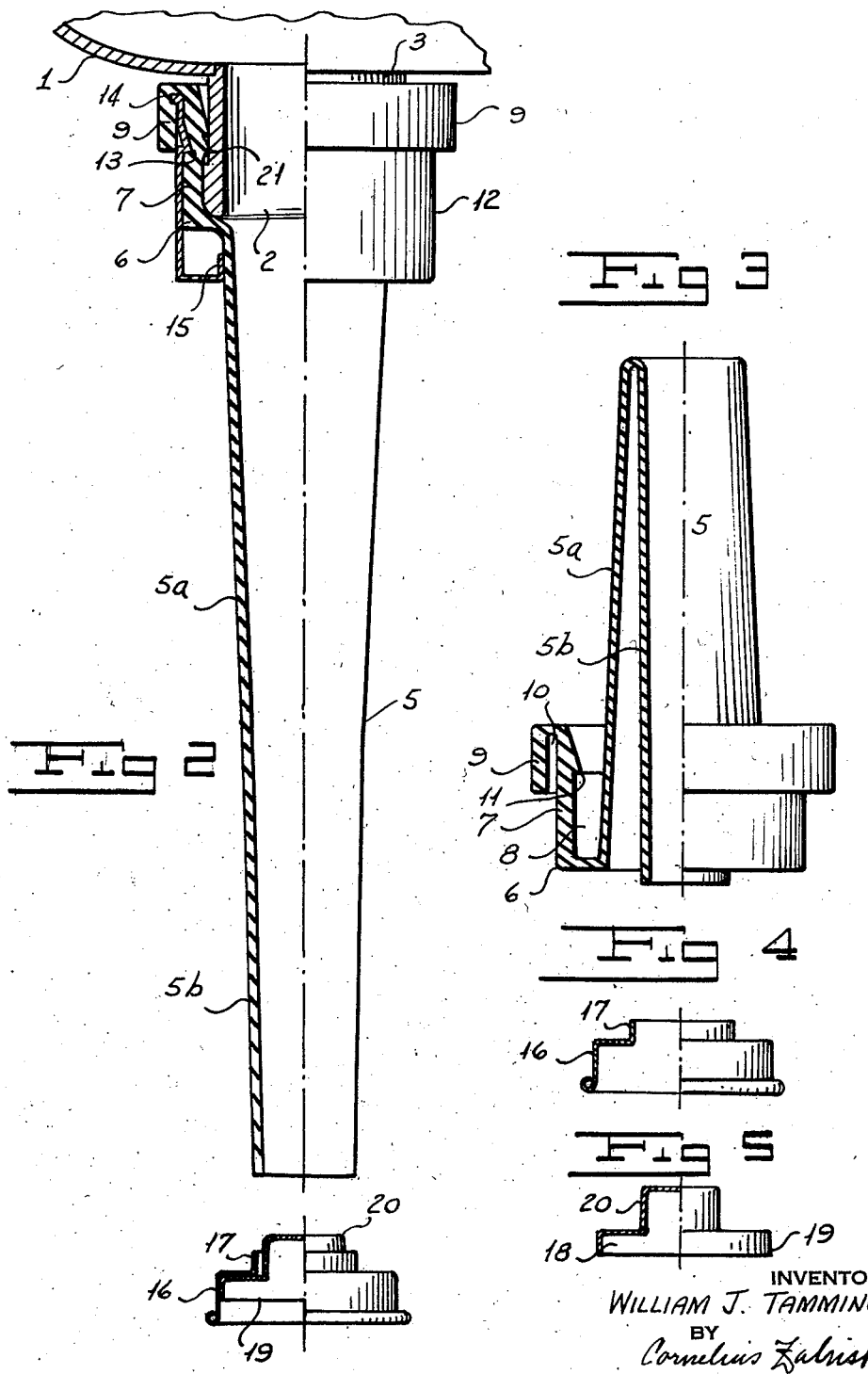

2,795,362
Patented June 11, 1957

2,795,362

MILK DISPENSER AND OUTLET UNIT THEREFOR

William J. Tamminga, Goshen, N. Y., assignor, by mesne assignments, to Monitor Dispenser Co. Inc., Montclair, N. J., a corporation of New Jersey Application September 6, 1955, Serial No. 532,432

11 Claims. (Cl. 222—529)

This invention is a milk dispenser and outlet unit which constitutes an improvement on the subject matter of my application, Serial No. 447,719, filed August 4, 1954. Said application matured into Patent No. 2,718,985 on September 27, 1955. In said copending application the milk to be dispensed is contained within a milk delivery can housed within a cabinet and is dispensed from the can through an outlet unit attached to a tubular outlet in the bottom of the can.

The present invention is directed primarily to a more simple and economical outlet unit embodying a flexible tubular nipple of improved form, adapted to be held on the outlet of the can by an improved ring construction with which is associated a cup and stopper closure for normally sealing the discharge end of the nipple and for protecting said end of the nipple from contamination.

The invention embodies several novel features which will be apparent from the following detailed description and appended claims when read in conjunction with the accompanying drawings.

The accompanying drawings illustrate one practical embodiment of the invention, but the construction therein shown is to be understood as illustrative, only, and not as defining the limits of the invention.

Fig. 1 is a central section showing the outlet unit of the present invention associated with the tubular outlet of a can, with the parts arranged in condition for shipment from a creamery.

Fig. 2 is a view, half in central section and half in elevation, showing the nipple withdrawn into dispensing position and the cup and plug removed to permit discharge of the milk from the can.

Fig. 3 shows the nipple separated from all of the parts.

Fig. 4 shows, partly in central section and partly in elevation, the cup element of the closure.

Fig. 5 is a like view of the stopper element of said closure.

Referring to the drawings, 1 designates the bottom wall of a milk delivery can which is provided near its periphery with a tubular outlet 2 permanently affixed to the bottom of the can. This tubular outlet is substantially cylindrical in form for a greater portion of its depth, but is provided at its lower end with an external bead 3, the upper edge of which has a shoulder 4. The nipple 5 of this invention is of flexible, resilient material, such as rubber or a plastic. It comprises a tubular sleeve which, when extended, appears as shown in Fig. 2. It may be tapered for the greater portion of its length, although, in practice, I preferably taper substantially the upper half 5a of the tubular portion and form the lower half 5b cylindrical or substantially so, so that the upper end of the tubular portion of the nipple is of somewhat greater diameter than the lower end. Both ends of the nipple are open and it is provided at its upper end with an enlarged head 6, preferably of somewhat greater thickness than the remainder of the nipple.

When preparing the nipple for use, the lower portion 5b is telescoped into the interior of the upper portion 5a and both of these portions are moved into re-entrant relation within the head, as shown in Fig. 3. When thus formed, the outer side wall 7 of the head forms between it and the portion 5a an annular channel 8, while the flange 9 of the head forms between it and the wall 7 an inverted annular channel 10. The inner surface of the wall 7 is provided intermediate its top and bottom with an inward offset 11 having a shoulder on its under side.

Prior to attachment to the can, there is associated with this nipple a binding ring 12, preferably of metal although it may be of plastic material. This binding ring is open at its upper end and closed at its lower end except for a central opening flange 15. The side wall of the ring is formed with an internal bead 13 and its upper free edge has a relatively short external flange 14.

When the upper portion of the ring 12 is seated within the channel 10, as shown in Fig. 1, it places the portion of the head which forms the channel 10, under slight outward, radial tension, so that the flange 14 of the ring tightly grips the wall of the channel 10. The internal bead at 13 also tends to bulge the contiguous portion of the wall 7 in an inward radial direction, as indicated at 21 in Fig. 1.

Into the opening within the flange 15 of the ring is adapted to be received, with a press fit, an inverted cup 16, the closed end of which has a central hole having a marginal flange 17 slightly tapered in an upward direction and of less internal diameter than the external diameter of the lower open end of the nipple 5. This flange 17 is adapted to surround and embrace the lower end of the nipple. A stopper 20 is adapted to be forced into the open end of the nipple with a sufficiently tight fit to cause said lower end of the nipple to be tightly gripped between the stopper 20 and the flange 17, as shown in Fig. 1. The stopper 20 is provided at its base with a flange 19 which has a tight forced fit within the cup 16. Said stopper and flange are shown at 18 as hollow, but they may be solid if desired.

In practice, the unit is supplied to the creamery with the ring 12, cup 16 and stopper assembled on the nipple, as shown in Fig. 1. To apply the complete unit as such to the tubular outlet 2 of the can, it is only necessary to press the unit against the end of said outlet with sufficient pressure to force the tubular outlet to enter into the channel 8 of the head and assume the position shown in Fig. 1. The can is then ready for filling with milk.

The resilient character of the nipple and particularly the head thereof permit the attachment of the unit to the can without the application of any great amount of force. However, after it has been applied, it will take considerable force to remove it because the bulged portion 21 must be withdrawn over the shoulder 4 which will require quite some force. Even if this bulge is withdrawn over said shoulder, the shoulder 11 on the interior of the wall 7 of the head will flatly abut the shoulder 4 of the tubular outlet and, after these shoulders come into contact, considerable force is required to withdraw the unit from said outlet 2.

As stated, the can is filled after application of the unit to the tubular outlet of the can, and said unit will not only form a tight seal against leakage of the milk from the can, but will effectually prevent contamination of all parts of the nipple with which the milk may come in contact. The filled can with the unit attached as described may thus be shipped from the creamery to a lunchroom or other milk dispensary where the can is placed in a cabinet as described in my aforesaid copending application.

After the can has been placed in the cabinet, the cup 16 may be readily pried loose from within the cup 16 by a screw driver, ordinary table knife, or any other suitable, convenient implement which may be introduced between the bottom wall of the ring and the rolled edge of the cup which forms a pry-off flange. When thus released from the ring 12, the cup may be grasped and pulled downwardly to withdraw the portions 5a and 5b of the nipple into the position shown in Fig. 2. The nipple may then be brought into proper cooperative relation with a milk controlling and dispensing valve, such, for example, as the valve mechanism shown in Figs. 9–12 of my said copending application or with any other appropriate pinch valve control mechanism, such, for example, as shown in my copending application, Serial No. 464,464, filed October 25, 1954.

After being properly associated with such valve, the cup 16 may again be grasped and pulled downwardly and this direct pull will free it from engagement with the lower end of the nipple. The cup and stopper will come away from the nipple in the manner shown in Fig. 2, leaving the lower end of the nipple open and ready for the dispensing of milk when the valve controlling the flow of milk through the nipple is actuated. When the cup and stopper are removed from the nipple, they remain permanently secured to one another because of the tight forced fit between them so that they cannot be re-used.

After all the milk has been withdrawn from the can, the can is removed from the cabinet and returned to the creamery where the entire unit is removed from the tubular outlet 2 and discarded, for this unit is a single use unit.

The removal of the used unit from the can may be accomplished by the use of a simple tool which will apply sufficient pressure to strip the used unit from the tubular outlet 2. There is no problem whatever to this operation as the removal of this unit simply requires the employment of sufficient power and that power is not excessive.

After the can has been thoroughly sterilized, a complete new, sterile unit is applied, as hereinbefore stated, and the can is ready for shipment after being filled with milk. If desired, the new unit may be applied to the can after the can has been cleaned and before sterilizing the can, for the unit may be sterilized in place on the can.

I wish to call particular attention to the simplicity of the unit of this invention and the manner of its application and subsequent manipulation. Special attention is directed to the sanitary character of this unit. It is usually sterilized before the several parts of the unit are assembled and may be packed individually in a sterile envelope, so that it is absolutely clean and sterile when it is applied to a sterilized can. Its application to the can may be accomplished instantaneously and, during the transport of the filled can from the creamery to the ultimate purchaser, all parts of the unit which contact with the milk are completely enclosed within the milk and within the ring and closure, so that there is no part of the nipple externally of the can and which comes into contact with the milk, which could possibly be contaminated by contact with anything exteriorly of the can. Moreover, the hands of the operator need not touch the nipple at any time, even during its association with the valve mechanism, for the hands of the operator may grasp the cup and thereby manipulate the nipple.

The foregoing detailed description sets forth the invention in its preferred practical forms, but the invention is to be understood as fully commensurate with the appended claims.

Having thus fully described the invention, what I claim as new and desire to secure by Letters Patent is:

1. A milk outlet unit comprising: a flexible nipple one end of which is provided with a head adapted to receive a tubular outlet of a milk can, and a ring member embracing the head and supporting a stopper extending into the other end of the nipple.

2. A milk outlet unit according to claim 1, wherein the ring member is provided intermediate its ends with an internal annular bead.

3. A milk outlet unit according to claim 2, wherein the ring member is provided with an external flange at the end of said member opposite to that which supports the stopper.

4. A milk outlet unit according to claim 1, comprising a cup fitted into an opening in the ring member and embracing the latter end of the nipple to clamp the wall of the nipple between the stopper and the cup and form a leakproof joint with the nipple.

5. A milk outlet unit comprising an elongated flexible tubular nipple provided at one end with means to secure it to the tubular outlet of a milk can, a stopper extending into the other end of the nipple, and a member embracing the latter end of the nipple contiguous to the stopper to clamp the stopper in place within the latter end of the nipple.

6. A milk outlet unit comprising: a flexible nipple larger at one end than at the other and provided at its larger end with a head forming a channel to receive the tubular outlet of a milk can, that portion of the nipple between the head and smaller end being returned upon itself with the two halves of its length in telescoped relation, a ring member embracing the head and provided at its base with an opening, a cup fitted into said opening and having a hole into which the smaller end of the nipple projects, and a stopper seated in the cup and extending into the end of the nipple to clamp the nipple between the stopper and the margin of the hole in the cup and seal that end of the nipple, said cup being removable from the opening in the ring member to permit the withdrawal of the telescoping portions of the nipple through the opening in the ring member without dislodging the cup and stopper from the nipple.

7. A milk outlet unit comprising: a flexible nipple, one end of which is adapted to embrace the tubular outlet of a milk can, and a closure comprising a ring exteriorly embracing that portion of the nipple adapted to embrace said tubular outlet and having an opening to which is detachably fitted a stopper extending into the other end of the nipple.

8. A milk outlet unit according to claim 6, wherein said cup is provided with a flange at its periphery to permit the cup to be pried loose from the ring member.

9. A milk outlet unit according to claim 6, wherein the ring member is provided with an internal annular shoulder adapted to press inwardly upon the head of the nipple.

10. A milk outlet unit according to claim 9, wherein the free edge of the ring member is provided with an external flange.

11. A milk outlet unit according to claim 6, wherein the stopper is permanently attached to the cup.

References Cited in the file of this patent

UNITED STATES PATENTS

| | | |
|---|---|---|
| 2,561,596 | Rieke | July 24, 1951 |
| 2,718,985 | Tamminga | Sept. 27, 1955 |